UNITED STATES PATENT OFFICE.

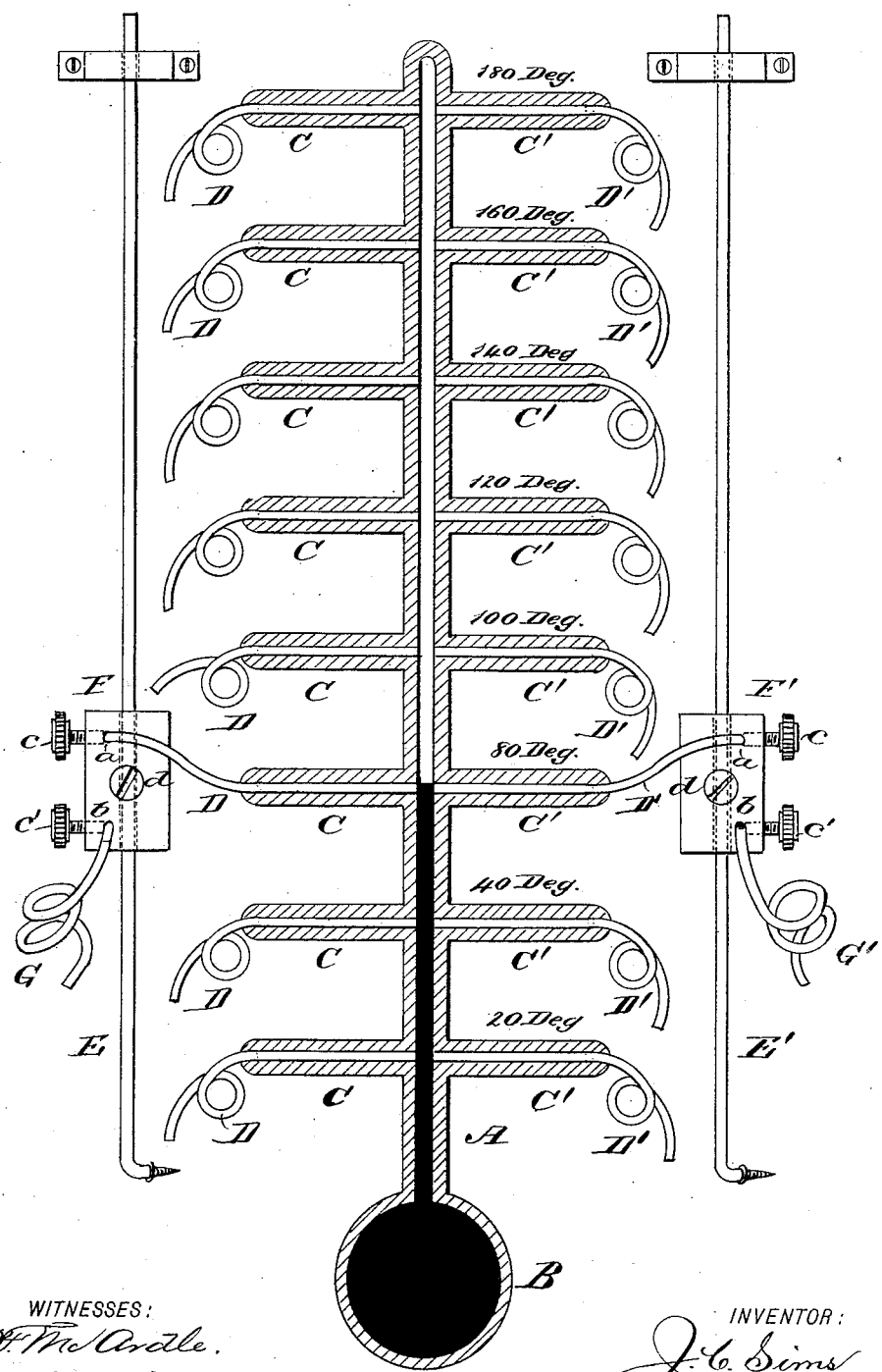

JESSE C. SIMS, OF MAYNARD, MASSACHUSETTS.

THERMOSTAT.

SPECIFICATION forming part of Letters Patent No. 450,896, dated April 21, 1891.

Application filed November 29, 1890. Serial No. 373,008. (No model.)

*To all whom it may concern:*

Be it known that I, JESSE C. SIMS, of Maynard, in the county of Middlesex and State of Massachusetts, have invented a new and Improved Thermostat, of which the following is a specification, reference being had to the accompanying drawing, which is a side elevation, partly in section.

My invention is an improvement in the class of electrical thermostats which include a thermometer or mercury tube having a series of wires sealed in it at different points for the purpose of forming an electric circuit at any one of said points, which is effected by rise of the mercury till it comes in contact with the corresponding wire. I employ a novel combination of parts, as hereinafter set forth.

The thermometer-tube A is provided at its lower end with a bulb B, containing mercury, and at intervals in the length of the tube are attached lateral branch tubes C C', containing wires D D', preferably of platinum, which are sealed therein. The lateral tubes of each pair are arranged upon diametrically-opposite sides of the thermometer-tube A, and the wires sealed in the said lateral tubes extend into the main tube A, so that they will touch the mercury as it rises in the said tube.

Upon opposite sides of the thermometer-tube provided with branches in the manner described are arranged rods E E', upon which are placed sliding metallic blocks F F', which are furnished with holes *a b* for receiving the wires and with binding-screws *c* for clamping the wires in their holes. The blocks F F' are also provided with screws *d* for holding them in any desired position upon the rods E E'.

The apparatus is arranged for use by connecting a pair of diametrically-opposite wires D D', which are located at the point on the thermometer-scale at which it is desired to produce an alarm or close an electric circuit, with the blocks F F', by inserting the ends of the said wires in the holes *a* of the blocks and clamping them by means of the screws *c*. Wires G G', connected with the alarm of the apparatus which it is desired to operate, are inserted in the holes *b* and clamped by the screws *c'*.

When the mercury in the tube A rises so as to form an electrical contact with the wires D D', connected with the blocks F F', the circuit is closed and the electrical apparatus is operated. When it is desired to indicate a falling temperature, the apparatus is placed on a closed circuit, and when the mercury leaves the wires D D', which are in circuit, the circuit is broken and the electrical devices are operated.

Having thus described my invention, I claim as new and desire to secure by Letters Patent—

1. In a thermostat, the combination of a thermometer provided with a bulb B and tube A, containing mercury, a series of lateral branch tubes C C', connected with the thermometer-tube A and containing wires D D', sealed in the lateral tubes and extending to the bore of the thermometer-tube, the rods E E', and the sliding blocks F F', placed on the rods and adapted to receive and clamp the electric wires, substantially as specified.

2. The combination, with a thermometer furnished with a series of lateral tubes containing conducting-wires sealed therein, of adjustable blocks F F', adapted to receive and clamp the wires, substantially as specified.

JESSE C. SIMS.

Witnesses:
JAMES N. HAIRE,
GEO. P. HARTMAN.